United States Patent [19]
Reyman

[11] Patent Number: 5,960,807
[45] Date of Patent: Oct. 5, 1999

[54] VIBRATION AND FLOW ACTUATED VALVE SHUTOFF SYSTEM

[76] Inventor: Mark Reyman, 16 W. First St., Mount Vernon, N.Y. 10550

[21] Appl. No.: 09/072,896

[22] Filed: May 5, 1998

[51] Int. Cl.[6] .............................. F16K 17/20; F16K 17/36
[52] U.S. Cl. .................................. 137/1; 137/10; 137/39; 137/460; 137/624.12
[58] Field of Search ........................ 137/39, 460, 624.12, 137/1, 10

[56] References Cited

U.S. PATENT DOCUMENTS

| | | | |
|---|---|---|---|
| 3,407,827 | 10/1968 | Follet | 137/39 |
| 4,098,284 | 7/1978 | Yamada | 137/39 |
| 4,167,194 | 9/1979 | Matsuda | 137/38 |
| 4,263,928 | 4/1981 | Kobayashi et al. | 137/39 |
| 4,349,042 | 9/1982 | Shimizu | 137/137 |
| 4,414,994 | 11/1983 | Hogan | 137/38 |
| 4,429,704 | 2/1984 | Jones | 137/45 |
| 4,463,773 | 8/1984 | Kojima et al. | 137/38 |
| 4,542,760 | 9/1985 | Flauiani | 137/45 |
| 4,546,660 | 10/1985 | Bujold | 74/2 |
| 4,550,744 | 11/1985 | Igashira et al. | 137/80 |
| 4,742,839 | 5/1988 | Sttock | 1137/38 |
| 4,821,759 | 4/1989 | Diamond | 147/45 |
| 4,841,287 | 6/1989 | Flig et al. | 340/690 |
| 4,852,600 | 8/1989 | Asbra et al. | 137/38 |
| 4,860,780 | 8/1989 | Fisher | 137/45 |
| 4,915,122 | 4/1990 | Ikegaya et al. | 137/38 |
| 4,959,581 | 9/1990 | Dantlgraber | 310/328 |
| 4,971,094 | 11/1990 | Gonzalez | 137/38 |
| 4,972,872 | 11/1990 | Hunt | 137/487.5 |
| 4,979,528 | 12/1990 | Asbra et al. | 137/38 |
| 5,029,610 | 7/1991 | Hiratsuka et al. | 137/557 |
| 5,038,820 | 8/1991 | Ames | 137/460 X |
| 5,048,552 | 9/1991 | Bourne | 137/39 |
| 5,388,606 | 2/1995 | Banks | 137/38 |
| 5,687,758 | 11/1997 | Schuster | 137/460 |

OTHER PUBLICATIONS

Automatic Switch Company, *Solenoid Valves for Combustion Systems*, Jan. 1, 1995.

*Primary Examiner*—Stephen M. Hepperle
*Attorney, Agent, or Firm*—Sofer & Haroun, LLP

[57] ABSTRACT

An automatically actuated regulation system for a natural gas pipeline having flow control unit, a vibration sensor, a gas flow meter, a trigger unit, and a microprocessor. The microprocessor actuates the flow control unit when two conditions are met. First, there must be a vibration which surpasses a predetermined threshold. Second, flow in the natural gas pipeline must have increased over the flow rate before the vibration.

38 Claims, 4 Drawing Sheets

VIBRATION AND FLOW ACTUATED VALVE SHUTOFF SYSTEM

FIELD OF THE INVENTION

This invention relates to automatically actuated valves, and more particularly, to a system which is capable of automatically regulating the flow of natural gas in pipelines.

BACKGROUND OF THE INVENTION

Natural gas flows from municipal gas mains to customer locations. At a customer location, gas is routed through smaller pipes into a gas meter. Pipes then carry the gas into a customer residence or business where the gas is ultimately used by appliances or other gas-consuming devices. While gas mains are susceptible to rupture from the violent vibrations caused by earthquakes, the smaller pipes leading into a residence or business are often at higher risk of rupture. In the aftermath of an earthquake, the damage resulting from fires caused by gas pipe rupture can oftentimes exceed the damage resulting from shaking caused by the earthquake.

There are numerous prior art proposals for gas shut-off valves which are designed to respond to earthquakes. Such proposals typically cause false shut-offs in response to non-earthquake vibrations. Furthermore, the prior art shut-off systems proceed to shut-off the gas flow regardless of whether there is a rupture in the gas line. This can result in repeated loss of gas service. As a result, these prior art systems are rarely implemented on a wide scale.

Thus there is the need for a relatively simple, cost-effective system, which can reliably detect the rupture of natural gas pipelines due to earthquake vibration and, in turn, shut-off gas supply only when warranted.

SUMMARY OF THE INVENTION

In accordance with one embodiment of the invention, an automatically actuated regulation system for a natural gas pipeline comprises a flow control device, a vibration sensor, a gas flow meter, a trigger unit, and a microprocessor. The microprocessor prompts the flow control device to restrict the flow of gas when two conditions are preferably met. The first condition is met when the vibration sensor detects a vibration that surpasses a predetermined threshold value. The second condition is met when the flow rate in the natural gas pipeline has increased over the flow rate before the vibration. The microprocessor receives data from the vibration sensor and the flow meter. Comparisons are then made and the flow control unit is actuated when the conditions are met.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof, may be best understood by reference to the following detailed description when read with the accompanying drawings in which:

DETAILED DESCRIPTION OF THE PRESENTLY PREFERRED EMBODIMENT

Figure 1:
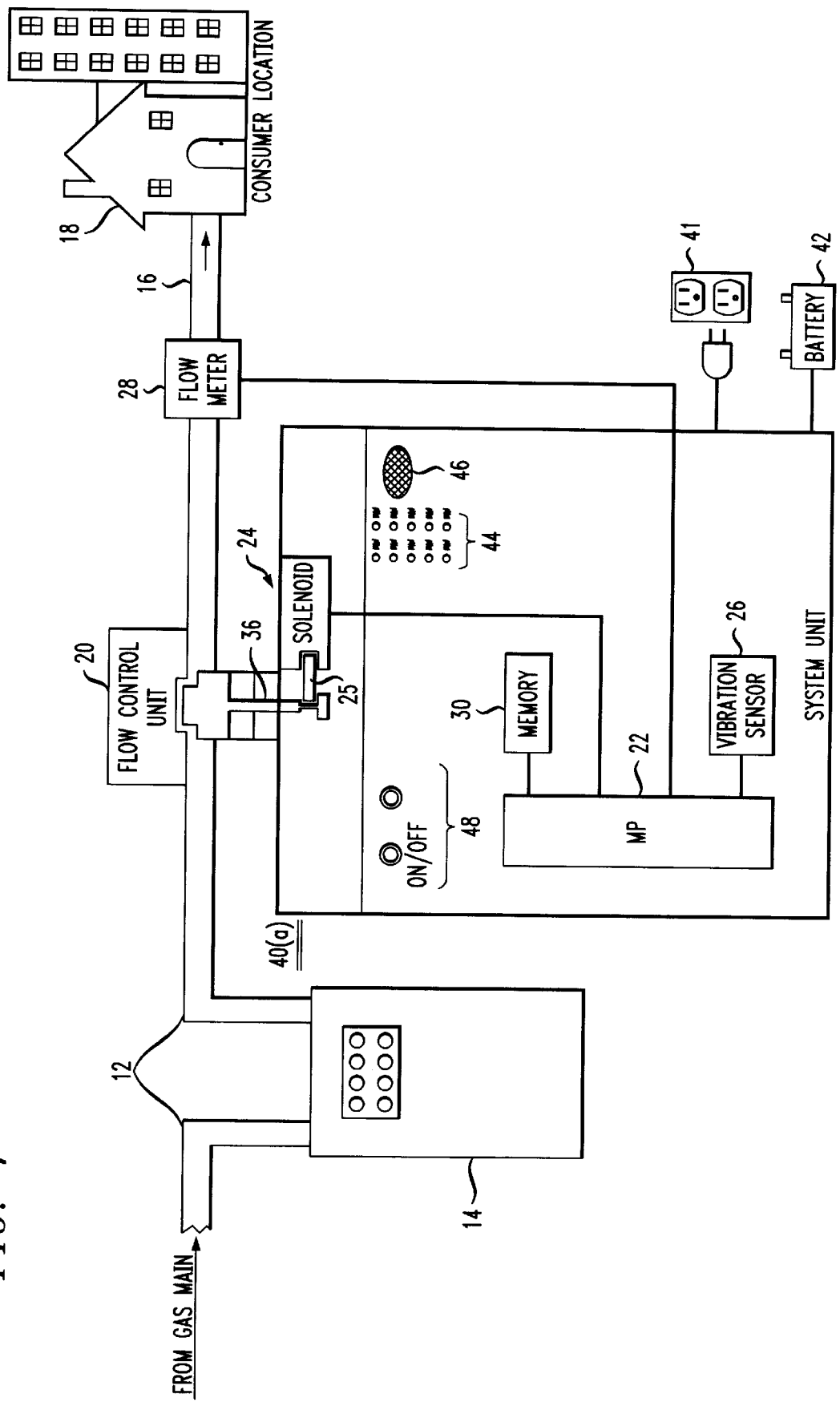
FIG. 1 is a block diagram of the basic components of a valve shutoff system in accordance with one embodiment of the present invention.

FIG. 1 illustrates, in block diagram form, an automatically actuated regulation system 40(a) for use with a natural gas pipeline 12 in accordance with one embodiment of the invention, although the invention is not limited in scope in that respect. For example system 40(a) may be employed to regulate the flow of other gaseous and fluid substances as will be appreciated by those skilled in the art.

Natural gas pipeline 12 is coupled to gas flow meter 14, which is configured to provide a measurement of gas flow for use by the gas supplier company. Gas pipeline 12 continues from an output port of gas meter 14. The flow of the gas in pipeline 12 on its way to different branches at consumer location 18 is then monitored by a flow meter 28 and controlled by regulation system 40(a) in accordance with one embodiment of the invention. Regulation system 40(a) interacts with flow control unit 20 that serves to control the flow of the gaseous or fluid substances to the consumer location 18. Flow control unit 20 may be placed in advance of gas meter 14, or may be combined with gas meter 14 as an integrated system. Such integration would simplify the entire mechanism and thus allow for the system to be manufactured less expensively. Another example is that flow control unit 20 may be triggered using a method other than the one employed in this embodiment.

Figure 2:
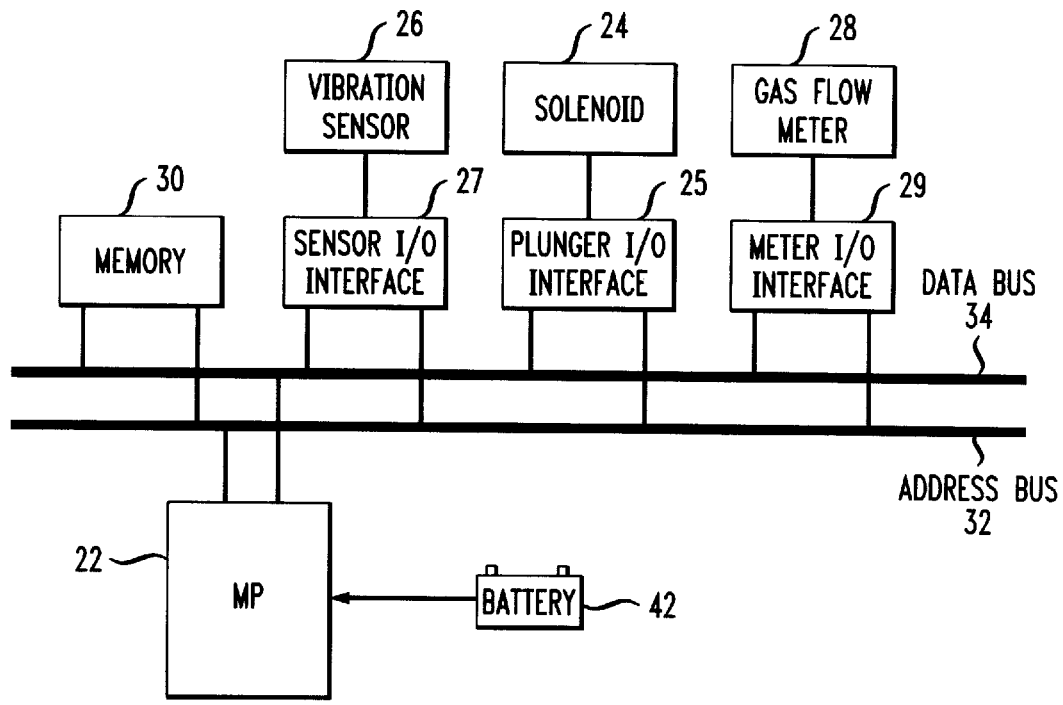
FIG. 2 is a block diagram of the electronic components of the shutoff system illustrated in FIG. 1.

Various components of the automatically actuated regulation system 40 (a) include a vibration sensor 26, a flow meter 28, and a trigger unit 24. Each of these components is connected to a microprocessor 22 using an input/output interface unit able to convert mechanical signals into electrical signals (FIG. 2).

In the preferred embodiment, vibration sensor 26 consists of a solid state piezoresistive accelerometer mounted on a printed circuit board. Typically, accelerometers are required if they are single axis type units and one will be required if they are a dual axis type. The use of accelerometers make it possible to adjust the threshold in which vibration sensor 26 provides a signal that signifies a vibration that has a may cause a rupture in the pipeline. An example of this is an accelerometer manufactured by EG&G IC Sensor, part number 3022, 3028, or 3031. Alternatively, vibration sensor 26 can be a small metal ball within a capsule, which makes or breaks a circuit when subject to sufficient vibration. An example of this is a motion switch manufactured by Durakool Switches, part number 20243.

Flow meter 28 is positioned to measure the flow within protected line 16. In the preferred embodiment, flow meter 28 is the consumer meter supplied by the local utility which has been modified. One modification might be in which a 'pulser' has been added to the meter face. As the dials of the meter move, this in turn causes the added pulser mechanism to move which includes a reed switch and cam. As the meter moves, this causes the cam to alternatively open and close the reed switch which in turn opens and closes a circuit creating a 'pulse'. This pulse is what microprocessor 22 uses to track the flow of the gas or fluid in the pipe. An example of a pulser is one manufactured by IMAC Systems, model number IMAC DMP. This pulser is offered at 10 pulses per revolution connected to the 'half foot' dial of the meter.

Alternatively, a turbine type flow meter can be used that would be integrated into the complete system in one compact package without relying on a diaphragm type meter which is standard issue for the utility company. An example of a turbine type meter is the SZ turbine meters distributed by IMAC Systems. These meters are suitable for combustion gases and are highly accurate and sensitive.

Also in the preferred embodiment, trigger unit 24 is a solenoid that includes a solenoid plunger 25. Trigger unit 24 is capable of activating flow control unit 20. In this embodiment, valve stem 36 has a protruding lip or a recessed surface on it so that when solenoid plunger 25 is extended, it will engage valve stem 36 keeping the valve in an open position. Conversely, when trigger unit 24 is actuated, solenoid plunger 25 disengages from a spring loaded valve stem 36 of a valve (flow control unit 20) allowing the valve stem to spring to a closed position. An advantage of using a solenoid is that it does not require power while remaining in an untriggered position. Instead, a brief pulse of current will cause the solenoid plunger to retract and release the spring loaded valve stem 36.

Alternatively, trigger unit 24 can be combined with the flow control unit 20 into one integrated package which should reduce the cost and size of the unit. If not combined, flow control unit 20 can be triggered by other methods besides solenoids. This includes but is not limited to magnetic, pneumatic or hydraulic, coupled actuation. Ideally, no power should be exerted to hold the valve open and a brief pulse should be all that is needed to actuate flow control unit 20. The reason that low power consumption is desirable is that when there is an earthquake of moderae or severe magnitude, there will most likely be a power interruption due to downed power lines. This leaves internal backup battery supply 42 to supply power to run vibration sensor 26, flow sensor 28, microprocessor 22, and when necessary, actuate flow control unit 20.

System unit 40 (a) is powered using AC power 41 which is backed-up by battery supply 42. Unit 40 (a) includes indicator lights 44 which provide a status update to the user. These lights may include, but are not limited to: AC power on/off, vibration sensor triggered, system alert, flow of gas detected, ruptured pipe detected, and battery weak. The system also includes an audible alarm 46 which sounds when a ruptured pipe is detected, battery 42 is weak, or the electrical line between flow meter 28 and microprocessor 22 is severed (in the preferred embodiment, if this line is severed, microprocessor 22 will stop the flow of gas). A user can control system unit 40 (a) through buttons 48. These buttons may include, but are not limited to, emergency shutdown (an additional way to shut off the gas in the event of an non-earthquake emergency such as a fire) and electronic reset.

During operation, natural gas enters the system through supply line 12 passing through gas meter 14 which determines the amount of gas consumed by the customer. The gas continues through supply line 12, passing through flow control unit 20 (when flow control unit 20 allows for the flow of natural gas). In the preferred embodiment, flow control unit 20 is a Red-Hat® Solenoid Valve for Combustion Systems (#HV216-585) (The valve can be found in ASCO® Catalog 102a, p.7.) After flow control unit 20, the gas enters and passes through protected line 16 and then into customer location 18.

Referring to FIG. 2, a block diagram is provided of microprocessor 22 and the components connected to microprocessor 22. Vibration sensor 26, trigger unit 24, gas flow meter 28, and, in one embodiment, memory 30, are coupled to the microprocessor 22 via I/O interface units 27, 25, and 29, respectively. The components and microprocessor 22 communicate through the use of data and address buses 34 and 32. Vibration sensor 26 provides vibration signals that have a magnitude corresponding to the level of seismic activity in the vicinity of the system.

Alternatively, vibration sensor 26 may provide a signal to microprocessor 22 when a vibration amplitude exceeds a predetermined value. The predetermined value can vary from application to application based on type of structure, foundation, the type of land the structure is on (soil, sand, rock, etc.), water table level, age of structure, and degree of Earthquake building code preparedness. For example, the office of the Division of the State Architect of the State of California has determined a set of standards known as Part 12, Title 24: Engineering Regulation-Quality and Design of the Materials of Construction. Standard number 12-23-1 is titled California Standard for Earthquake Actuated Automatic Gas Shutoff Systems. It states that the sensing means of the valve or system shall actuate the shutoff means within 5 seconds when subjected to a horizontal, sinusoidal oscillation having a peak acceleration of 0.3 g and a period of vibration of 0.4 second. The sensing means of a valve or system shall not actuate the shutoff means when subjected for 5 seconds to horizontal, sinusoidal oscillations having:

1. A peak acceleration of 0.4 g with a period of vibration of 0.1 seconds;
2. A peak acceleration of 0.08 g with a period of vibration of 0.4 seconds and;
3. A peak acceleration of 0.08 g with a period of vibration of 1.0 seconds.

Gas flow meter 28 provides a gas flow signal to meter I/O 29. Microprocessor 22 preferably monitors the gas flow signal and calculates a corresponding average signal over a predetermined period as specified by the user. Trigger unit 24 is configured to be triggered by microprocessor 22 via plunger I/O interface 23. Thus when microprocessor 22 is directed to activate trigger unit 24, it generates a control trigger signal to trigger unit 24. In response to this trigger signal, trigger unit 24 activates flow control unit 20 which disrupts the flow of gas in pipeline 16. Memory 30, which may be integrated into microprocessor 22 itself, is capable of storing information such as predetermined vibration levels and average flow data.

The flow data consists of a number of pulses within a specified time-frame, typically one minute. Given a typical utility supplied, residential diaphragm type gas meter, the pulse count can range from zero to approximately 10 depending on the meter rating and of course the load. When vibration sensor 26 is triggered, microprocessor 22 will then monitor the flow meter 28 for a specified period of time. If after that time, no increase in flow is detected, trigger unit 24 will not be activated. The time frame is typically one minute though other times are possible. This time frame gives the average structure one minute to collapse from the end of the last vibration. If the structure doesn't fail within one minute, the chances are it won't fail and the microprocessor 22 resets. Thus, after receiving data from vibration sensor 26 or gas flow meter 28, microprocessor 22 is able to compare results stored in memory.

Figure 3:
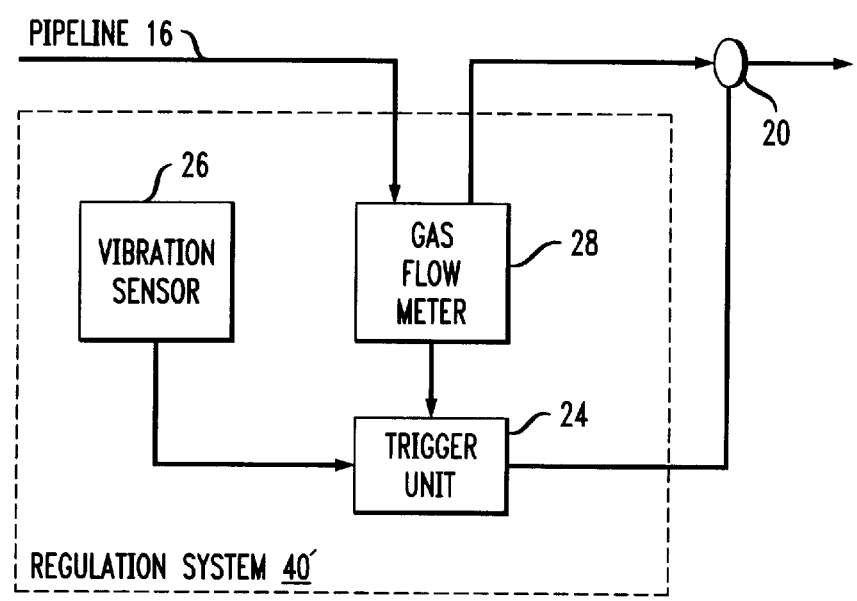
FIG. 3 is a block diagram of the system in accordance with another embodiment of the invention.

FIG. 3 illustrates a block diagram of a regulation system, such as 40 (a)' in accordance with another embodiment of the invention, although the invention is not limited in scope in that respect. Vibration sensor 26 is coupled to a trigger unit 24, and is configured to provide vibration sensing signals to an input port of the trigger unit. Similarly, gas flow meter 28 is configured to measure the flow of gas traveling in pipeline 16 and provide a corresponding flow signal to another input port of trigger unit 24. An output port of trigger unit 24 is coupled to an input port of a flow control unit 20, which is disposed along the flow of gas to control this flow traveling in pipeline 16.

In accordance with one embodiment of the invention trigger unit 24 is configured to interpret signals from sensor 26 and meter 28. Trigger unit may include logic circuitry to generate a trigger signal to control unit 20 when vibration sensor 26 generates a vibration signal that is above a predetermined vibration threshold level, and when the flow of gas as measured by gas flow meter 28 is above a predetermined threshold level as well. In accordance with one embodiment of the invention, the gas flow threshold level may be set to the gas flow prior to the generation of the vibration signal above a vibration threshold level. It is noted that trigger unit 24 may be employed in either hardware or software arrangement or both, in accordance with one embodiment of the invention.

Figure 5:
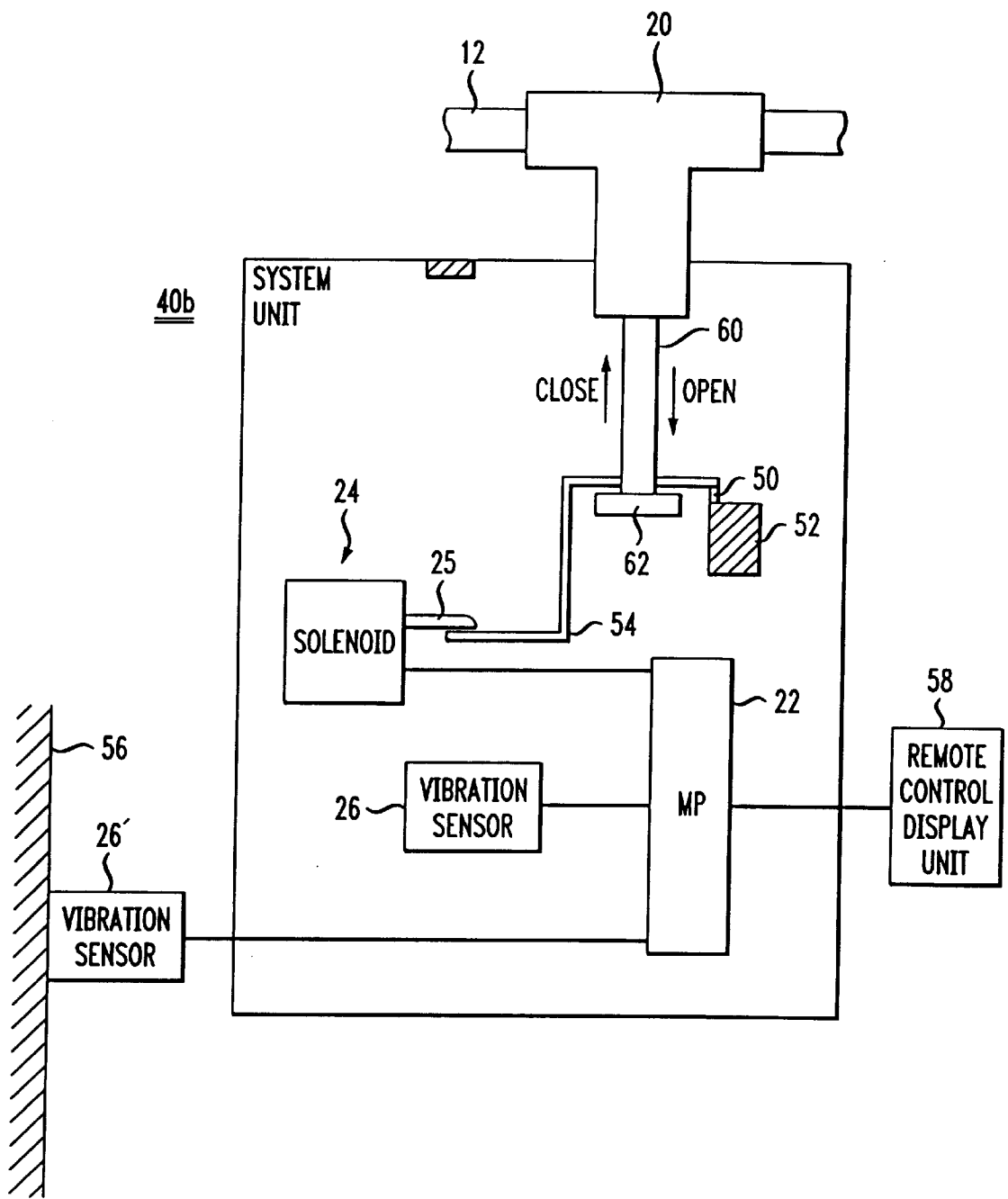
FIG. 5 is a block diagram of another embodiment of a valve shutoff system in accordance with another embodiment of the present invention.

FIG. 5 is a block diagram of an automatically actuated flow regulation system 40 (*b*) in accordance with another embodiment of the invention. As illustrated system 40 (*b*) includes an on-board vibration sensor 26 and a remote vibration sensor 26'. Vibration sensor 26' is advantageously disposed at a remote location such as the foundation wall 56. Alternatively, if the consumer unit does not have a basement and is built on a slab, vibration sensor 26' may be anchored onto the floor. By removing the vibration sensor from the main unit, the system substantially avoids false triggers. This follows because, non-earthquake causes of vibration, such as trucks rolling by, or airplanes flying over, may trigger the vibration sensors by causing the pipes to which the main unit is attached to vibrate. Typically, the pipes to which the sensor unit is attached vibrate more readily than other structures at the consumer unit, such as the foundation wall or floor surfaces.

System unit 40 (*b*) is also coupled to a remote control display unit 58. Remote control display unit 58 may be located near an exit door or other locations that may be easily accessed by the consumer in the event of an emergency. In the event of fire or other types of emergency, requiring the shut down of the gas flow, a control button at remote control display unit may be pressed to provide a shutoff instruction signal to microprocessor 22 as illustrated in FIG. 5. Furthermore, remote control display unit 58 may preferably display other control elements such as LED's or LCD's that indicate the status of the operation of system unit 40 (*b*).

System unit 40(*b*) also includes a spring loaded valve stem 60 that has a base 62, which engages a release arm 54, which is hinged at one end to an anchor 52 vi a hinge 50. The other end of release arm 54 is biased downwardly by a solenoid plunger 25 so as to pull valve stem 60 down by exerting force on base 62. As illustrated, when valve stem 60 is biased downwardly valve 20 remains open. When it is desired to close valve stem 20, solenoid 24 is energized so as to pull plunger 25 in, causing the release of arm 54. As a result arm 54 swings up, which in turn allows valve stem 60 to rise and thus, close valve 12. In order to reset trigger unit 24, release arm 54 is pulled down causing plunger 25 to retract again. Once arm 54 moves sufficiently down, plunger 25 is extended again to bias arm 54 downwardly so that it holds valve stem 60 in open position. Preferably, release arm 54 is made of aluminum which is strong and relatively light.

Figure 4:
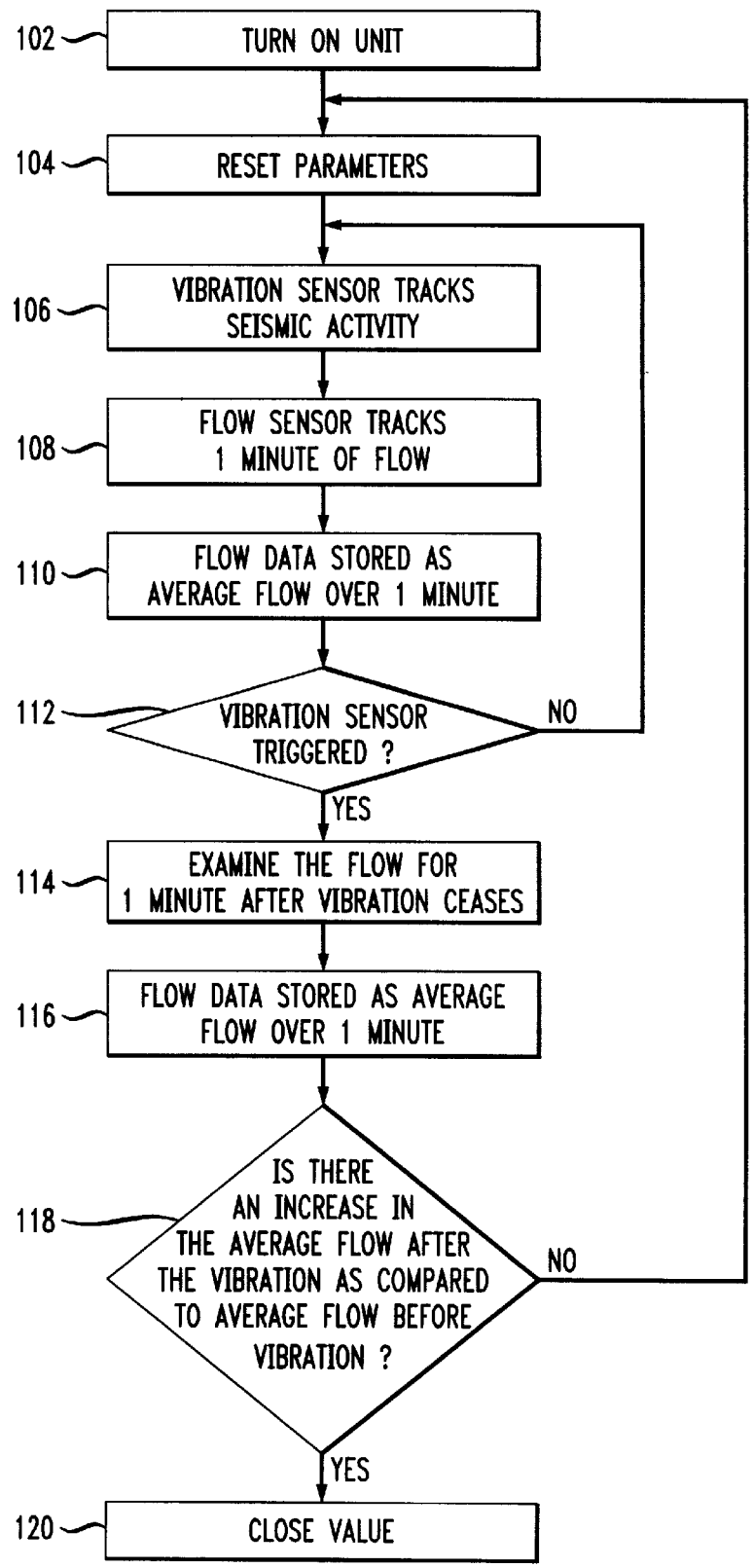
FIG. 4 is a flow chart of the steps carried out by the present system.

Referring now to FIG. 4, a flow chart depicts the steps carried out by system unit 40 (*a*). At step 102 unit 40(*a*) is turned on either by AC power 41 or by the battery backup 42. At step 104, microprocessor 22 resets the parameters of microprocessor 22. For example, one parameter would likely be average flow registers. At step 106, microprocessor 22 monitors vibration sensor 26 to determine whether there is a high vibration. At the same time, at step 108, microprocessor 22 keeps track of the flow of gas based on a flow signal provided by gas flow meter 28. At step 110, the data collected in step 4 are stored in memory 30 as an average flow over one minute. Step 112 is a decision point in which microprocessor 22 determines whether a predetermined level of vibration has occurred. If such a vibration has not occurred, microprocessor 22 returns to step 106. If such a vibration has occurred, microprocessor 22 moves to step 114. At step 114, microprocessor 22 reexamines the average flow of gas for one minute after the vibration occurred. At step 116, as in step 110, flow rate data is stored in memory 30 as an average flow. At step 118, microprocessor 22 compares the flow rate before and a period of time after the vibration. If there is no such change in flow, microprocessor 22 returns to step 104. Alternatively, if the average flow rate is higher than the average flow rate before the vibration, microprocessor 22 moves to step 120. At step 120 the valve is closed.

It is noted that the specified period of time to measure the flow rate after the occurrence of a vibration can be varied depending on system design specifications. For example, the one minute period to measure the flow rate after the occurrence of a vibration may be reduced or enlarged to other desired time periods.

It is also noted that in accordance with another embodiment of the invention, the pre-vibration flow rate is stored even after the system is reset at step 104 after the determination made at step 118 that no increase of flow has been indicated after a vibration. When the system is reset at step 104, it takes a certain period of time, for example, 60 seconds to establish a new average flow rate. If a vibration occurs during this sixty seconds time period, the system employs the pre-vibration flow rate to compare it with the flow rate after the occurrence of the second vibration. The pre-vibration flow rate remains in memory for the same period of time that it is necessary to establish a new average flow rate: sixty seconds for the present example. This arrangement prevents the valve to close in the event an after shock occurs before a new flow rate is established after a first vibration.

Thus, the present invention is an arrangement which provides a relatively simple, cost-effective system, which can reliably detect rupture of natural gas pipelines due to earthquake vibration. This system is reliable because of the two steps used in determining whether or not flow control unit 20 should be closed. The initial trigger is a predetermined vibration amplitude. After a vibration, microprocessor 22 determines whether or not there is an increase in the flow of gas through protected line 16. Such an increase in flow will often mean that pipeline 16 has ruptured. Only then will microprocessor 22 close flow control unit 20.

It should be noted this system has been specifically designed for natural gas pipelines. However, it is possible that such a system can be used with gas pipelines of any kind. Also, it is feasible that such a system may be used with pipelines which carry liquid.

While only certain features of the invention have been illustrated and described herein, many modifications, substitutions, changes or equivalents will now occur to those skilled in the art. It is therefore to be understood that the appended claims are intended to cover all such modifications and changes that fall within the true spirit of the invention.

What is claimed is:

1. An automatically actuated regulation system for gas and other fluids flowing in a pipeline comprising:
   a microprocessor configured to control said regulation system;
   a flow control unit coupled to said microprocessor, said flow control unit configured to regulate the flow through said pipeline when activated;
   a vibration sensor coupled to said microprocessor, said sensor configured to determine seismic activity of the earth in the vicinity of said system, and generate a vibration indication signal corresponding to the amplitude of said seismic activity;
   a gas flow meter coupled to said microprocessor, said meter configured to provide a flow signal corresponding to the measure of gas flow through said pipeline;
   a trigger unit, said trigger unit coupled to said flow control unit and configured to activate said flow control unit; and
   said trigger unit activating said flow control unit when
      said vibration indication signal is larger than a first predetermined threshold value, and
      said measure of flow signal is larger than a second threshold value.

2. The system in accordance with claim 1, wherein said second threshold value is the average value of said flow signal over a predetermined time period.

3. The system in accordance with claim 1, wherein said flow control unit is a spring-loaded valve.

4. The system in accordance with claim 3, wherein said trigger unit is a solenoid having a solenoid plunger.

5. The system in accordance with claim 1, wherein said system is equipped to provide a status update through a group of illuminated indicators.

6. The system in accordance with claim 5, wherein said group of illuminated indicators indicate presence of said vibration indication signal, said flow signal, and a rupture of said pipeline.

7. The system in accordance with claim 1, wherein said system is equipped to provide a status update through an audible alarm.

8. The system in accordance with claim 7, wherein said audible alarm indicates presence of a rupture in said pipeline or the disruption of said flow signal from said gas flow meter to said microprocessor.

9. The system in accordance with claim 1, wherein said system is configured to receive a plurality of mechanical inputs.

10. The system in accordance with claim 9, wherein said plurality of mechanical inputs result in activation of said flow control unit and reset of parameters stored by said microprocessor.

11. The system in accordance with claim 1, wherein said system is powered by an uninterruptable power supply comprising an AC power supply and a back-up battery supply, said back-up battery providing power when said AC power supply fails.

12. The system in accordance with claim 1, further comprising a housing for containing said microprocessor, wherein said flow control unit couples said housing to said pipeline.

13. The system in accordance with claim 12, wherein said vibration sensor is located remotely from said housing.

14. The system in accordance with claim 4, wherein said trigger unit comprises:
   a release arm having one hinged end and one free end, wherein said free end is retained by said solenoid plunger so as to bias said flow control unit in a closed position.

15. An automatically actuated regulation system for gas and other fluids flowing in a pipeline comprising:
   a microprocessor configured to control said regulation system;
   a flow control unit coupled to said microprocessor, said flow control unit configured to regulate the flow through said pipeline when activated;
   a vibration sensor coupled to said microprocessor, said sensor configured to determine seismic activity of the earth in the vicinity of said system, and generate a vibration indication signal in response to said seismic activity;
   a gas flow meter coupled to said microprocessor, said meter configured to provide a flow signal corresponding to the measure of gas flow through said pipeline;
   a trigger unit, said trigger unit coupled to said flow control unit and configured to activate said flow control unit; and
   said trigger unit activating said flow control unit when
      said vibration indication signal is generated, and
      said measure of gas flow signal is larger than a threshold value.

16. The system in accordance with claim 15, wherein said microprocessor defines said threshold as the average value of said flow signal over a predetermined time period.

17. The system in accordance with claim 15, wherein said flow control unit is a spring-loaded valve.

18. The system in accordance with claim 17, wherein said trigger unit is a solenoid plunger.

19. The system in accordance with claim 15, wherein said system is equipped to provide a status update through a group of illuminated indicators.

20. The system in accordance with claim 19, wherein said group of illuminated indicators indicate presence of said vibration indication signal, said flow signal, and rupture of said pipeline.

21. The system in accordance with claim 15, wherein said system is equipped to provide a status update through an audible alarm.

22. The system in accordance with claim 21, wherein said audible alarm indicate presence of a rupture in said pipeline or the disruption of said flow signal from said gas flow meter to said microprocessor.

23. The system in accordance with claim 15, wherein said system is equipped to receive a plurality of mechanical inputs.

24. The system in accordance with claim 23, wherein said plurality of mechanical inputs will result in activation of said flow control unit and reset of parameters stored by said microprocessor.

25. The system in accordance with claim 15, wherein said system is powered by an uninterruptable power supply comprising an AC power supply and a back-up battery supply, said back-up battery providing power when said AC power supply fails.

26. An automatically actuated regulation system for a gas pipeline comprising:
   a vibration sensor that generates a vibration signal in response to seismic activity in the vicinity of said regulation system;
   a gas flow meter coupled to said gas pipeline that is configured to generate a gas flow signal corresponding to the flow of gas traveling through said gas pipeline;
   a trigger unit coupled to said vibration sensor and said gas flow meter and configured to generate a trigger signal, when said vibration signal is larger than a vibration threshold value, and when said gas flow signal is larger than a gas flow threshold signal; and a flow control unit coupled to said trigger unit, said flow control unit configured to regulate the flow through said pipeline when activated in response to said trigger signal.

27. The system in accordance with claim 26, wherein said microprocessor defines said second threshold as the average value of said flow signal over a predetermined time period.

28. The system in accordance with claim 27, wherein said flow control unit is a spring-loaded valve.

29. The system in accordance with claim 28, wherein said trigger unit is a solenoid plunger.

30. The system in accordance with claim 26, wherein said system is equipped to provide a status update through a group of illuminated indicators.

31. The system in accordance with claim 30, wherein said group of illuminated indicators indicate presence of said vibration indication signal, said flow signal, and a rupture of said pipeline.

32. The system in accordance with claim 26, wherein said system is equipped to provide a status update through an audible alarm.

33. The system in accordance with claim 32, wherein said audible alarm indicate presence of a rupture in said pipeline.

34. The system in accordance with claim 26, wherein said system is equipped to receive a plurality of mechanical inputs.

35. The system in accordance with claim 34, wherein said plurality of mechanical inputs will result in activation of said flow control unit and reset of parameters stored by said microprocessor.

36. The system in accordance with claim 26, wherein said system is powered by an uninterruptable power supply comprising an AC power supply and a back-up battery supply, said back-up battery providing power when said AC power supply fails.

37. A method for automatically regulating the gas flow through a gas pipeline by, which comprises:

measuring gas flow in a pipeline;

measuring vibration in the vicinity of said pipeline, and providing a vibration indication signal;

measuring gas flow after it is determined that value of said vibration indication signal exceeds a first predetermined threshold;

comparing gas flow, before value of said vibration indication signal exceeds said first predetermined threshold, to gas flow, after value of said vibration indication signal exceeds said first predetermine threshold; and stopping the flow of gas when the gas flow, after value of said vibration indication signal exceeds said first predetermined threshold, exceeds a second threshold.

38. The method in accordance with claim 37, wherein said second threshold is defined as the average flow of said gas flow over a predetermined time period.

* * * * *